United States Patent [19]

Cobbs, Jr. et al.

[11] Patent Number: 4,778,631
[45] Date of Patent: Oct. 18, 1988

[54] METHOD AND APPARATUS FOR FOAMING HIGH VISCOSITY POLYMER MATERIALS

[75] Inventors: Walter H. Cobbs, Jr., Amherst; Robert J. Huddleston, Bay Village, both of Ohio; Chan I. Chung, Schenectady, N.Y.; Laurence B. Saidman, Westlake, Ohio

[73] Assignee: Nordson Corporation, Amherst, Ohio

[21] Appl. No.: 36,871

[22] Filed: Apr. 9, 1987

Related U.S. Application Data

[63] Continuation-in-part of Ser. No. 783,162, Oct. 2, 1985, abandoned.

[51] Int. Cl.$^4$ ............................................. C08J 9/30
[52] U.S. Cl. .................................... 261/128; 261/141; 261/92; 261/DIG. 26; 264/50; 425/4 R
[58] Field of Search ...................... 264/50; 261/83, 84, 261/108, DIG. 26, 92; 425/4 R

[56] References Cited

U.S. PATENT DOCUMENTS

| | | | |
|---|---|---|---|
| 2,397,818 | 4/1946 | Tausch | 261/92 X |
| 2,934,325 | 4/1960 | Haglund | 261/92 |
| 3,171,725 | 3/1965 | Eckey | 261/92 X |
| 3,177,126 | 4/1965 | Charreau | 261/92 X |
| 3,211,148 | 10/1965 | Galajda, Jr. | 261/92 X |
| 3,348,829 | 10/1967 | Grimes | 261/92 X |
| 3,353,337 | 11/1967 | Gale | 261/92 X |
| 3,402,919 | 9/1968 | Haglund | 261/92 |
| 3,499,186 | 3/1970 | Sassa . | |

FOREIGN PATENT DOCUMENTS 646591 11/1959 United Kingdom .

OTHER PUBLICATIONS

Bulletin No. 110, Oakes Machine Corporation, "Oakes Continuous Mixer for Chemical Processing Applications".
Bulletin No. 112, Oakes Machine Corporation, "Continuous Mixers/Foamers for Chemical Processes".
Bulletin No. 113, The E. T. Oakes Corporation, "Continuous Mixers for the Foam Latex and Plastisol Industries".

*Primary Examiner*—Philip Anderson
*Attorney, Agent, or Firm*—Wood, Herron & Evans

[57] ABSTRACT

Polymer materials having viscosities ranging from about 50,000 up to above 1,000,000 centipoises are mixed with a gaseous foaming agent to provide a polymer/gas solution under pressure such that when the polymer/gas solution is subsequently dispensed at atmospheric pressure the gas is released from the solution and becomes entrapped in the polymeric material to form a homogeneous polymer foam. Mixing is accomplished by force feeding the gas and polymeric material into and through a low energy input disk mixer with a low pressure drop across the mixer such that premature foaming or reaction of the polymeric material is avoided. The disk mixer includes a tubular housing, one or more driven shafts extending along the length of the housing, and a series of disks spaced along the shafts. The foaming gas enters into solution in the polymer in the compartments between the rotating disks. The process is characterized in that relatively high viscosity polymeric materials are mixed with gas and foamed with relatively low horsepower requirements, high throughput and low temperature rise of the polymer from conversion of the work of mixing to heat.

18 Claims, 4 Drawing Sheets

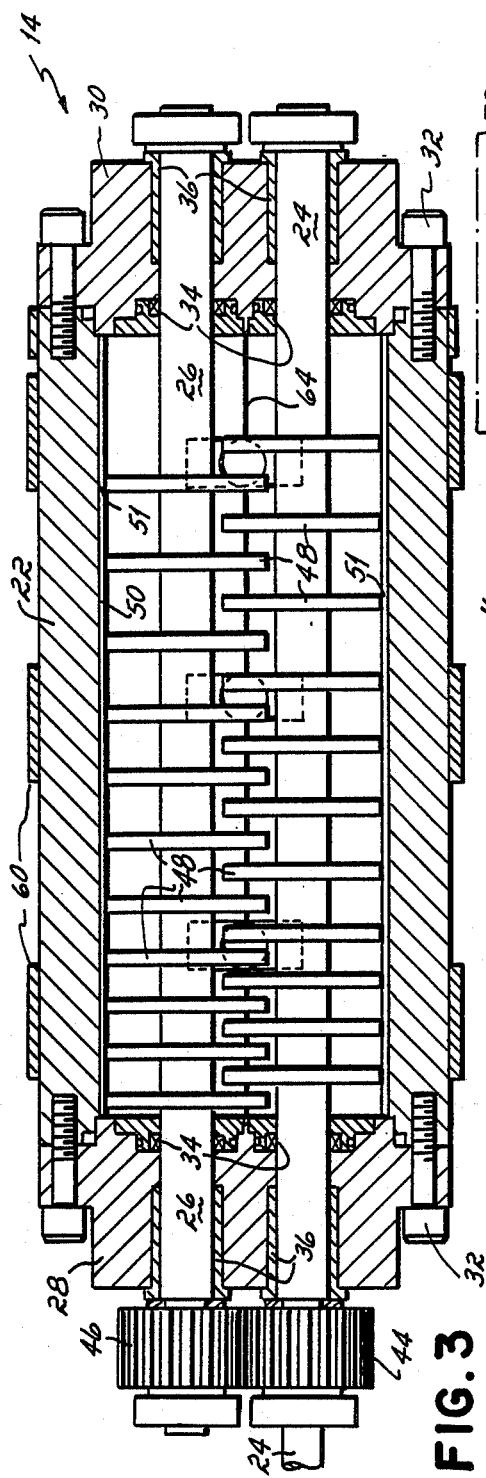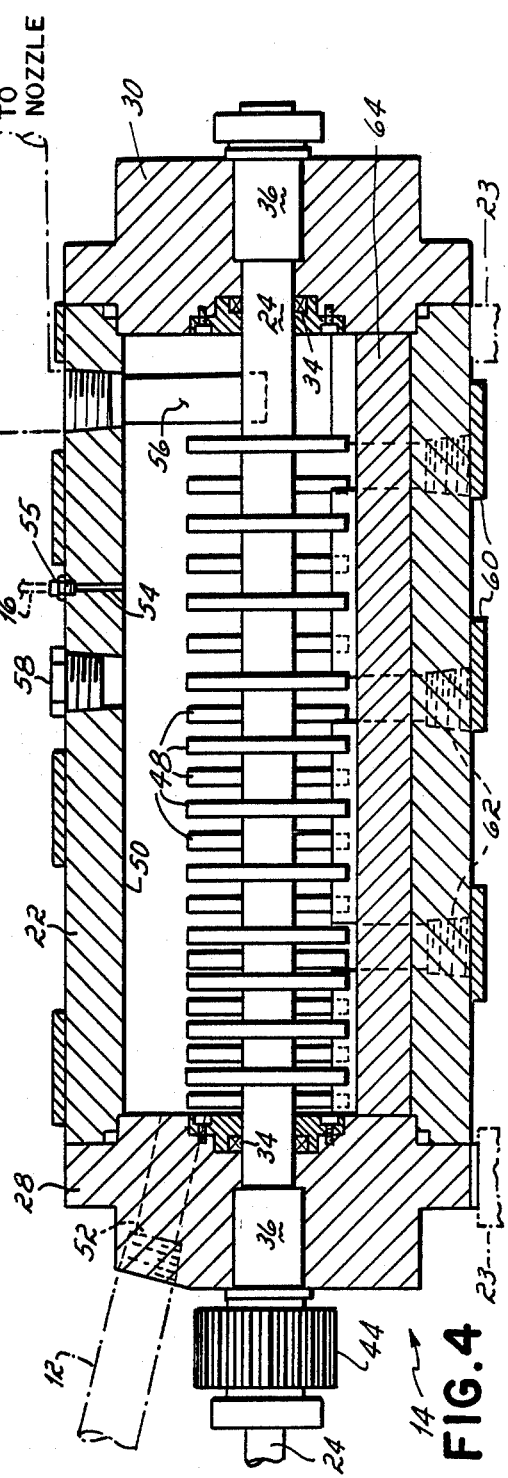

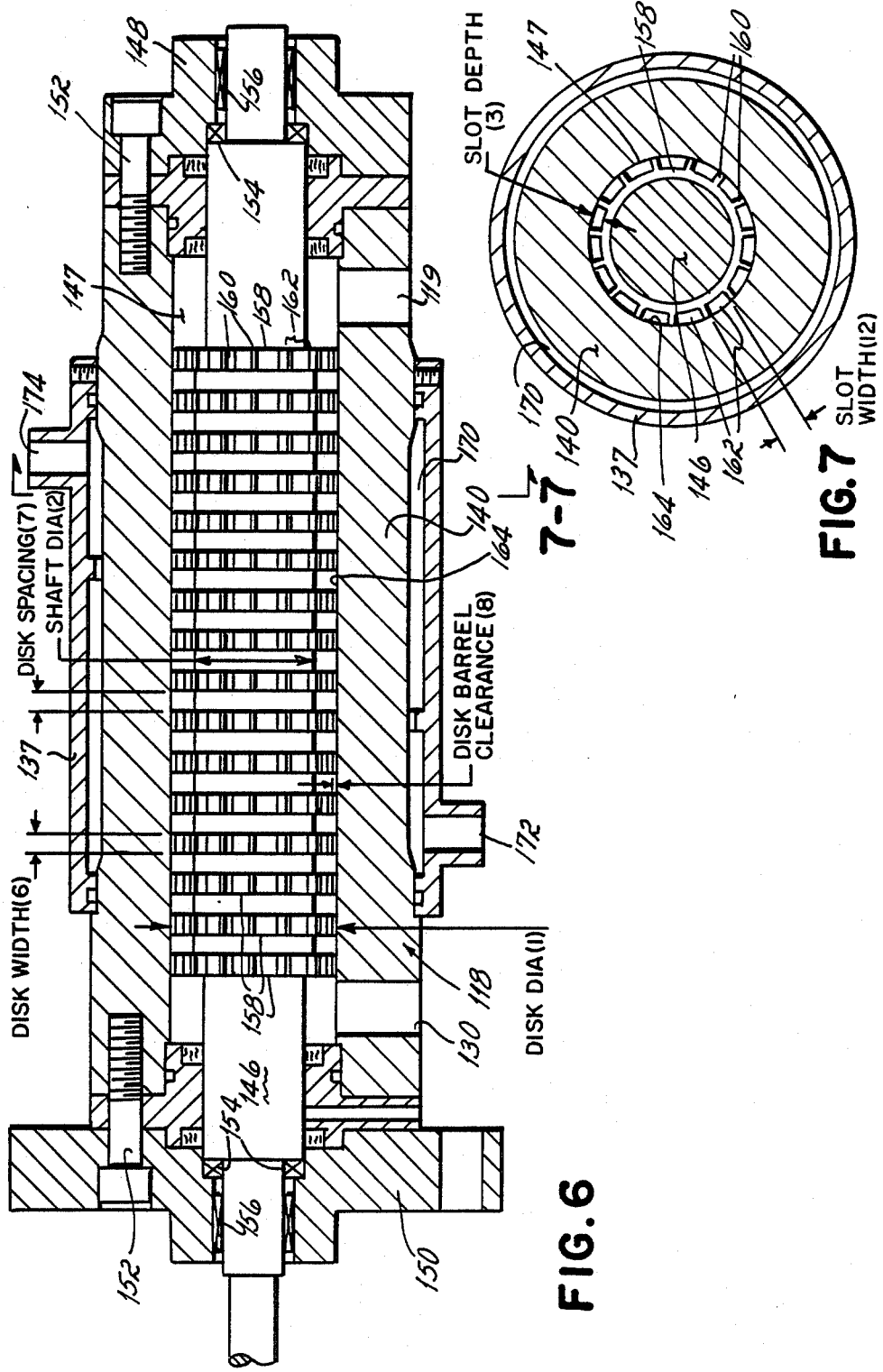

METHOD AND APPARATUS FOR FOAMING HIGH VISCOSITY POLYMER MATERIALS

CROSS-REFERENCE TO RELATED APPLICATIONS

This application is a continuation-in-part of U.S. Ser. No. 783,162, filed Oct. 2, 1985 now abandoned.

BACKGROUND OF THE INVENTION

The assignee of this invention pioneered the development and application of methods and apparatus for foaming hot melt thermoplastic adhesives or so-called "hot melts" widely used throughout the industry for adhering many diverse products, as well as polymeric coatings and paints.

With respect to hot melt adhesives, for example, the assignee of this invention discovered that the adhesive strength of a bond achieved with a given volume of a selected hot melt adhesive could be appreciably improved and in most instances at least doubled if the adhesive were applied as a foam rather than as a conventional non-foamed adhesive. A hot melt thermoplastic adhesive foam system is disclosed in U.S. Pat. No. 4,059,466 of Scholl et al wherein a solid mixture of hot melt thermoplastic adhesive and blowing agent is heated and melted in a heated reservoir at a temperature above the melting temperature of the adhesive but below the decomposition temperature of the blowing agent. The molten adhesive and solid blowing agent mixture is then pressurized by a gear pump and supplied under pressure as, for example, 300 pounds per square inch, to a hot melt dispenser. Between the pump and the outlet of the hot melt dispenser, the molten adhesive and solid blowing agent mixture is further heated to a higher temperature at which the blowing agent decomposes and evolves a gas as, for example, nitrogen, which, at that pressure goes into solution with the liquid adhesive. The pressurized liquid/gas adhesive solution is then supplied to a valved type outlet at the adhesive dispenser from which the adhesive is dispensed at atmospheric pressure. Upon emerging from the outlet nozzle of the dispenser, the gas evolves from the solution in the form of small bubbles causing the adhesive to expand volumetrically. The resultant adhesive in an uncompressed state sets up as a homogeneous solid foam having gas cells substantially evenly distributed throughout the adhesive.

In U.S. Pat. No. 4,059,714 of Scholl et al, there is disclosed another hot melt thermoplastic adhesive foam system wherein the molten adhesive is mixed with a gas and pressurized by either a one-step or two-step gear pump. Within the gear pump, the gas and molten adhesive are thoroughly mixed and the gas is forced under pump outlet pressure into solution with the liquid adhesive. The pressurized liquid/gas adhesive solution is then supplied to a valved type dispensing gun from which the adhesive is dispensed at atmospheric pressure. Again, upon emerging from the outlet nozzle of the dispenser, the gas evolves from the solution in the form of small bubbles causing the adhesive to expand volumetrically and forming in an uncompressed state, a homogeneous solid foam having gas cells evenly distributed throughout the adhesive.

As set forth in the patents recited above, the methods for mixing the gaseous foaming agent with the molten adhesive and pressurizing the gas into solution in the adhesive is the use of a one or two-step gear pump. In this application, a molten adhesive and foaming gas flow into the interior of the gear pump where the meshing teeth of a pair of gears causes the gas and molten adhesive to be thoroughly mixed and the gas to be forced under pressure into solution to form a molten adhesive/gas solution. The gear pump is operable to increase the pressure of the gas and molten adhesive mixture to a pressure of approximately 300 pounds per square inch at which pressure the gas contained within the molten polymer is maintained in solution with the molten polymer, a condition in which it remains until dispensed at atmospheric pressure to form the foam. The intermeshing gear teeth of the pump operate as multiple small pistons to pull incoming liquid into the pump, pressurize it, and dispense it from the pump outlet. Hot melt adhesive compositions which have been foamed employing a gear pump as disclosed, for example, in U.S. Pat. No. 4,059,714 include conventional polyethylene-based hot melt adhesive compositions, such as Eastabond A-3 and A-32 manufactured by Eastman Chemical Company. These materials range in viscosity from about 2,200 cps to 20,000–35,000 cps at the usual dispensing temperatures of about 350° to 400° F.

It has been found, however, that when it is attempted to foam relatively high viscosity polymeric materials such as thermoset sealant materials having viscosities in the range of 50,000 to above 1,000,000 cps, a gear pump system becomes unacceptable for a number of reasons including inadequate mixing of the gas and polymer, unacceptable temperature rise of the polymeric materials, and reduced throughput. The problem of inadequate mixing is somewhat complex. First, since the viscosity of air or the gas to be mixed into the polymer is essentially zero, and the viscosity of the polymer quite high, the mixing of the one very low viscosity material into another very high viscosity material is difficult. Second, since the viscosity of the material is quite high, there are large line losses involved in moving the material through pumps, hoses, pipes, and the like making use of a recirculation system to increase mixing unacceptable. Third, because of the problem of temperature increase of the polymeric material, as discussed below, the addition of mixing or pumping devices to the system, which impart energy to the polymer, is generally not an acceptable solution to the problem of large line losses.

Some temperature rise is tolerable with some thermoplastic resins, for example, when foaming thermoplastics such as polyisobutylene-based materials and polyethylene-based hot melts but for thermosetting materials such as silicone RTV (room temperature vulcanizing) rubbers such temperature rise results in premature curing of the material giving it very short "open time" or even causing its setting up in the foaming equipment causing equipment stoppage. Likewise, such temperature rise can cause degradation of the polymer depending on its chemical structure or premature foaming in the system because of the increase in vapor pressure of the gas with temperature increase.

Investigation of the cause of the unacceptable throughput rates and temperature rise when attempting to foam high viscosity polymer materials using a gear pump has revealed that the action or mechanical work of the pump on the polymer material is converted to heat which raises the temperature of the polymeric material. As stated, a temperature rise as observed makes foaming of such relatively high viscosity materials using a conventional gear pump to be commercially impracticable.

Still further, in addition to the problem of overcoming large line losses in the system due to the nature of such high viscosity materials, there is also the problem of starving the input to the gear pump. In other words, the normal suction generated at the input of a gear pump is inadequate to draw sufficient quantities of such high viscosity materials into the pump to provide adequate throughput.

SUMMARY OF THE INVENTION

This invention in one of its main aspects is predicated upon the discovery that solutions of gas in polymeric materials having high viscosities on the order of 50,000 to above 1,000,000 cps can be achieved with commercially acceptable throughput rates and with minimal and acceptable temperature rise of the polymeric material by force feeding the gas and polymeric material into and through a low energy input mixer with a low pressure drop across the mixer such that a combination of circumstances causing premature foaming or reaction of the material is avoided. That is, by mixing the gas and polymeric material in a low energy input mixer, the introduction of heat into the system, which can cause premature foaming or curing of the polymer material is avoided. The problem of too high a pressure drop across the mixer causing premature foaming is likewise avoided.

In accordance with the present invention, mixing the foam producing gas with the polymeric material is accomplished by means of a disk mixer having a series of spaced disks on a rotating shaft within and extending along a housing containing the gas and polymeric material under pressure. It has been found that by mixing the gas and polymer in such a disk mixer that a solution of gas bubbles in the polymeric material under pressure can be achieved such that when the solution is dispensed, with release of pressure, there is produced continuous and immediate foaming of the polymeric material with the gas being released from solution and becoming entrapped in the polymer to form a homogeneous foam.

In its general aspect, the present invention provides a unique system for foaming high viscosity materials which overcomes the shortcomings described above found in previously known systems for foaming relatively lower viscosity materials. The system includes a pump which is capable of transferring or moving very high viscosity materials with low shear and low energy input to the materials. Second, the overall pressure drop of the system is kept sufficiently low relative to the temperature increase of the material to maintain the gas in solution throughout the system and up to the discharge nozzle to avoid foaming of the material prior to discharge. Specifically, sufficient pressure differential across the nozzle is provided to maintain the gas in solution prior to discharge, yet to permit foaming after discharge. Last, a mixing device is provided which is sufficiently efficient in mixing to provide a homogeneous mix of polymer and gas with no adverse temperature rise which would cause cross-linking of thermosetting materials or premature foaming.

One form of disk mixing apparatus employed in the present invention includes a tubular housing having a pair of substantially parallel, oppositely driven shafts extending along the length of the housing having a series of spaced, solid, flat disks on each shaft substantially perpendicularly to the axis thereof with the disks of one shaft intermeshing with the disks on the other shaft, and a stator within the housing extending along the length of the housing and having a surface contour corresponding closely to the contour of a portion of the intermeshing disks. The intermeshing disks serve to divide the housing into a series of compartments along its length. The polymer to be foamed is introduced in liquid form at one end of the housing. A polymer/gas solution outlet extends from the other end of the housing. The foaming gas is introduced into the polymer either upstream of the disk mixer as gas bubbles or in the mixer itself where it fills a head space above the polymer. The parallel shafts are driven in opposite directions causing the intermeshing disks to rotate with respect to one another. Rotation of the disks causes laminar flow of the polymer material with respect to the faces of the disks and stretches the added gas bubbles generating the necessary surface area for dissolution of the gas in the polymer to occur. When the gas is added to the head space above the polymer in the mixer, rotation of the disks causes relative motion of the polymer material between shafts, the polymer material entraining the gas in the head space and forcing the gas into solution in the polymer. The mixer breaks up large bubbles of gas in the polymer and entrains very small bubbles at the nip formed between the disks and the wall of the housing. Rotation of the disks also causes the gas/polymer solution to be conveyed along the length of the housing through the series of individual compartments.

In another form of the disk mixing apparatus employed in the present invention, the mixer includes a tubular housing and a driven shaft extending along the length of the housing having a series of spaced disks substantially perpendicularly to the axis thereof. The disks are toothed about their outer circumference to provide a profile of arcuately spaced teeth with slots therebetween. The teeth extend substantially to the inner wall of the housing whereby the spaced slots form with the fixed inner wall of the housing a series of circumferentially-spaced chambers between teeth. The chambers serve to divide the housing into a series of rotating compartments from disk to disk along its length. The polymer to be foamed and the foaming gas are introduced in liquid and gaseous form, respectively, at one end of the housing. A polymer/gas solution outlet extends from the other end of the housing. The shaft is driven causing the disks to rotate with rotation of the shaft. Rotation of the disks causes the breakup of gas bubbles in the polymer, shearing of the polymer material in the disk slots with respect to the fixed inner wall of the housing, and cutting and twisting of the polymer as it moves between disks thereby stretching and breaking up the added gas bubbles and generating the necessary surface area for dissolution of the gas in the polymer to occur.

The result of the mixing operation is that a polymeric material such as a polymeric material suitable for use as a adhesive, sealant, coating, gasketing material, and many other uses is produced having a dispersion and solution of gas bubbles therein. The polymer/gas solution is then transferred out the polymer/gas outlet under pressure to a dispensing device such as a valved nozzle from which the material is dispensed at atmospheric pressure.

Throughout this specification and claims the term "solution" is used to describe the liquid polymer containing a dissolved gas supplied under high pressure to the dispensing device, which creates a foamed polymeric structure when dispensed at atmospheric pressure. The term "solution" as used in the specification and the claims of the application is intended to define and encompass the broader generic definition of solution which is a homogeneous mixture of a gas and a molten or liquid polymer, whether or not the gas molecules are in fact dissolved or dispersed among the polymer molecules.

Upon emerging from the outlet nozzle of the dispenser, the gas evolves from the solution in the form of small bubbles, which enlarge causing the polymer material to expand volumetrically. The resultant product in an uncompressed state becomes a homogeneous foam having gas pores or cells, which may be of various forms including both open and closed cells, substantially evenly distributed throughout the polymer. As the polymer material cools or cures, a permanent homogeneous foam is created. Alternatively, the polymeric foam, such as a hot melt adhesive, before curing or setting could be compressed as, for example, between two flaps of a carton. By virtue of the foaming of the material, an adhesive bond of greatly improved strength is achieved with a given volume of hot melt adhesive over a conventional non-foamed adhesive. (The advantages of such a foamed adhesive are described in detail U.S. Pat. No. 4,059,466).

As noted, this invention achieves continuous foaming of a variety of polymeric materials having a wide range of viscosities extending above 1,000,000 centipoises. That is, a significant feature of this invention is its applicability to a wide range of classes of thermoplastic and thermosetting materials which may not be suitable for foaming otherwise because of their relatively high viscosity and sensitivity to temperature rise. The present invention is capable of mixing a foaming gas with relatively high viscosity polymer materials and placing that gas in solution at commercially practicable throughput rates with minimal and acceptable temperature rise of the material to provide a continuous output of foamed polymeric material. Thus, by the method and apparatus of this invention, diverse thermoplastic and thermosetting materials may be reliably foamed with uniform quality output of low density foam material at commercially practicable throughput rates.

BRIEF DESCRIPTION OF THE DRAWINGS

FIG. 3 is a cross-sectional view taken along line 3—3 of FIG. 2;

FIG. 4 is a cross-sectional view taken along line 4—4 of FIG. 2.

FIG. 6 is a cross-sectional view of another form of disk mixer used in the practice of the method of this invention taken along the longitudinal axes of the shaft; and FIG. 7 is a cross-sectional view taken along line 7—7 of FIG. 6.

DETAILED DESCRIPTION OF THE INVENTION

Figure 1:
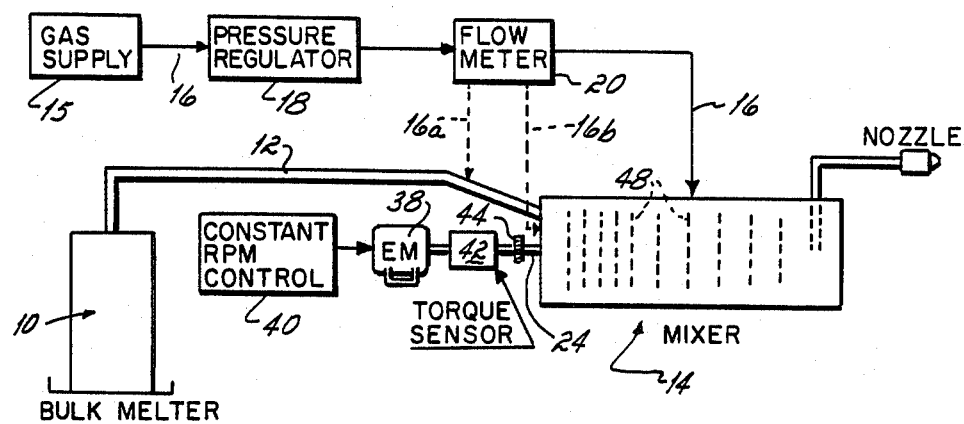
FIG. 1 is a schematic of a system for performing the foaming method of this invention.

As stated above, the present invention is useful for foaming both thermoplastic and thermosetting polymeric materials.

A "thermoplastic material," as that term is used and understood to those skilled in the art, includes any natural or synthetic thermoplastic polymer or polymeric compositions. A thermoplastic material is a normally solid or semi-solid material at use temperatures and it melts or liquifies upon heating to a higher temperature. Upon cooling, the material solidifies or returns to a solid or semisolid state. As also used in this description, the term "thermoplastic hot melt adhesive" or "hot melt adhesive" is a term which is well known in the art and this material has the same characteristics of liquification upon heating and, upon cooling, solidification to a solid, semi-solid or tacky state.

A "thermosetting material," as that term is used and understood to those skilled in the art, includes any natural or synthetic thermosetting polymer or polymeric compositions. Thermosetting resins are often liquids at some stage of processing, which are cured by heat, catalyst or other chemical means. After being fully cured, thermosets are substantially infusible and insoluble and cannot be liquified by heat.

Examples of thermoplastic materials include polymers of ethylenically unsaturated monomers, such as polyethylene, polypropylene, polybutylenes, polystyrenes, poly (-methyl styrene), polyvinyl chloride, polyvinyl acetate, polymethyl methacrylate, polyethyl acrylate, polyacrylonitrile and the like; copolymers of ethylenically unsaturated monomers such as copolymers of ethylene and propylene, ethylene and styrene, and polyvinyl acetate, styrene and maleic anhydride; styrene and methyl methacrylate; styrene and ethyl acrylate; styrene and acrylonitrile; methyl methacrylate and ethyl acrylate and the like; and polymers and copolymers of conjugated dienes such as polybutadiene, polyisoprene, and polychloroprene. Examples of thermosetting materials useful in this invention include synthetic butyl rubbers, synthetic isoprene rubbers, silicone RTV (room temperature vulcanizing) rubbers, styrenebutadiene rubber, ethylene-propylene-diene rubber, acrylonitrile-styrenebutatiene rubber and the like; saturated and unsaturated polyesters including alkyds and other polyesters; nylons and other polyamides; polyesteramides and polyurethanes; chlorinated polyethers, epoxy polymers, cellulose esters such as cellulose acetate butyrate, and the like. These materials can have viscosities extending above 1,000,000 cps.

The term "thermoplastic material" is sometimes used herein interchangeably with "hot melt," "melt," "hot melt thermoplastic" or "hot melt adhesive." It is, of course, to be appreciated that all these compositions are characterized by their thermoplastic nature as above defined. Examples of thermoplastic or hot melt adhesive compositions having markedly different viscosities (as measured by the Brookfield viscometer) employed in the operating examples which follow are conventional polyethylene-based adhesive compositions manufactured by Eastman Chemical Company. One is "Eastabond A-3" having a viscosity of 2,200 cps at 350° F. The other is "Eastabond A-32" having a viscosity of 35,000–40,000 cps at 350° F. Another example of a thermoplastic material is a polyisobutylene-based thermoplastic sealing and caulking material sold by Tremco Company under the name Tremco Butyl Sealant JS-792. This material has a viscosity in the range of 740,000 cps at 375° F. and 970,000 cps at 350° F. An example of a thermosetting material is a relatively highly viscous polymer material, Dow Corning 732 RTV manufactured by Dow Corning Company, which is a thermosetting RTV silicone rubber.

In addition to the variability in polymer formulations, different types of gases may be employed in the practice of this invention including air, nitrogen, oxygen, carbon dioxide, methane, ethane, butane, propane, helium, argon, neon, fluorocarbons such as dichlorodifluoroethane and monochlorotrifluoromethane, or other gases, or mixtures of any of these gases. Such gases can be varied again according to the types of polymeric materials and other additives employed.

Referring now to FIG. 1 of the drawings, a schematic illustration of a system for performing the method of this invention is shown. In this embodiment, the apparatus employs a bulk source of polymeric material such as a bulk melter 10 containing heating means for liquifying a solid or semi-solid polymer material and pumping it from the tank. An example of a bulk melter is shown in U.S. Pat. No. 4,073,409 also assigned to the assignee of this invention and that description is incorporated herein by reference. The pump is a cartridge-type gear pump, however, any pump capable of providing sufficient pressure to pump the material from the bulk container is suitable. This could include a dual axis screw pump integrated with the disk mixer. Alternatively, hot melt could be provided from conventional, commercially available hot melt dispensers. When employing heat-sensitive or curable material, the source of polymer material is of course not heated.

The material to be foamed is conveyed through line 12, which may be a hose capable of conveying heated material under pressure, to the upstream end of a disk mixer 14 where it is injected into the mixer.

The foaming gas is supplied to the disk mixer from a pressurized gas supply 15 through a gas line 16. A pressure regulator 18 and flow meter 20 in line 16 permit control of gas pressure and flow rate to the mixer 14. As shown in FIG. 1, the gas may be supplied to the system through several alternative paths. One is to fill the mixer only partially full with polymer material and to fill the head space in the disk mixer over the polymer material with gas from line 16 (shown in solid) to a desired pressure whereupon in the mixer the polymeric material to be foamed entrains the gas from the head space on operation of the mixer to form the polymer/gas solution. An alternative gas flow path 16a (shown in dotted) is to meter gas bubbles into the line 12 supplying the polymeric material to the mixer 14 such that the gas and polymer enter the mixer together and completely ffill it for placing the gas into solution in the polymer in the mixer. Another alternative 16b (also shown in dotted) is to have a porous end plate in the mixer and to supply gas bubbles through the porous end plate to the mixer 14, which is completely filled with polymer, and into the polymer. Any of these alternative methods may be used depending upon application; however, for purposes of illustration, supplying the foaming gas to the head space in the mixer 14 through line 16 is illustrated as one embodiment.

Figure 2:
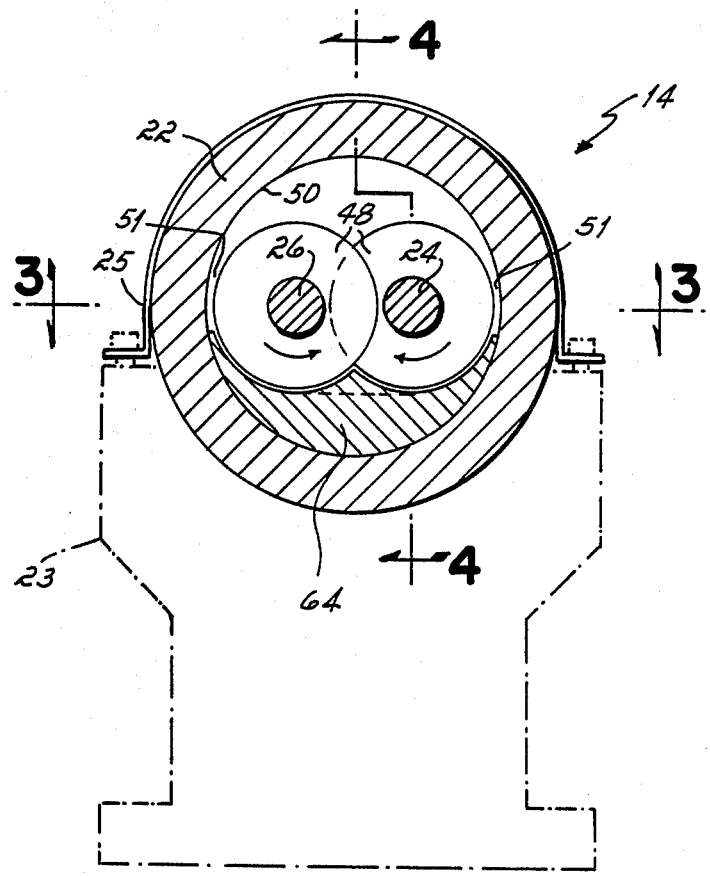
FIG. 2 is a cross-sectional view of one form of disk mixer used in the practice of the method of this invention taken along the line transverse to the longitudinal axes of the shafts on which the disks are mounted.

Referring now to FIGS. 2-4, the construction of the disk mixer 14 is shown in detail. The mixer 14 comprises a tubular housing 22 which is supported on a base 23 (shown in dotted in FIG. 2) in a substantially horizontal position and may be secured thereto by means of straps 25. Extending along the long axis of the housing 22 are a pair of substantially parallel shafts 24, 26. Upstream and downstream end caps 28 and 30, respectively, are secured to the respective opposite ends of the housing 22 by suitable means such as screws 32. The end caps 28 and 30 close the housing 22 ends and include suitable thrust bearings 34 and journals 36 for supporting the shafts in the end caps 28, 30 for rotation. Since some applications such as the foaming of hot melt adhesives takes place at elevated temperatures, e.g., 350° F., the seals must be able to withstand these elevated temperatures. Alternatively, small grooves can be placed in the shafts to pump material back into the housing interior 50.

As shown in FIG. 1, one of the shafts 24 is driven by an electric motor 38. A constant rpm controller 40 can be used to control motor speed. A torque sensor 42 is used to sense and to control the level of material in the mixer since under constant processing conditions the torque to drive the shafts is directly related to the amount of material being processed. The drive shaft 24 includes a gear 44 which meshes with a like gear 46 on the adjacent driven shaft 26 such that on rotation of drive shaft 24 in one direction the driven shaft 26 rotates in the opposite direction.

Each shaft 24, 26 includes a series of spaced, solid, flat disks 48 which are substantially perpendicular to the axis of the shafts 24, 26. As best seen in FIGS. 2 and 3, the disks 48 intermesh or overlap one with another in the space between the two shafts 24, 26. Moreover, the disks extend substantially to the inner circumference 50 of the housing 22 creating a nip 51 therebetween. Operation of the drive motor 38 causes rotation of the shafts 24, 26 in opposite directions (shown by arrows in FIG. 2) which causes the overlapping faces of the intermeshing disks 48 to move with respect to one another and the circumference of the disks 48 to move with respect to the fixed housing interior 50.

The polymeric material enters the housing 22 through a port 52 in the upstream end cap 28 of the housing 22. Line 16 is connected to port 52 by a suitable fitting (not shown). The foaming gas delivered to the housing through line 16 enters through an opening 54 in the housing wall 22. Line 16 is connected to opening 54 by a suitable pressurized hose fitting 55. As stated, alternatively the opening 54 could be placed in the material line 12 or end cap 28 or the foaming gas could be injected through a porous end plate into the material in the housing. As best seen in FIGS. 3 and 4, the upstream disks 48 (i.e., those disposed toward the end cap 28) are more closely spaced to one another than the downstream disks. This progressively increasing spacing of the intermeshing disks with respect to one another from upstream end to downstream end may provide some advantage in conveying material along the housing, particularly the more highly viscous materials. However, it is not believed that the disk spacing is critical, and this invention equally contemplates uniform spacing of the disks one with another.

A material outlet in the form of a dip tube 56 extends through the housing wall 22 at the downstream end of the housing to a level of at least the center line of the shafts 24, 26. The dip tube 56 permits the polymer material having gas mixed in solution therewith and being under pressure in the housing to exit up the dip tube 56 and be conveyed to a dispensing nozzle. That is, in the embodiment shown in the drawings, the interior of the housing is filled to a level only to the top of the shafts with the space or head above the material being filled with foaming gas pressurized, e.g., to 300-350 psi. This pressure forces the material up the dip tube 56 and to the dispensing nozzle. Since the dip tube 56 extends down to the centerline of the shafts, it is assured that gas in the head space does not inadvertently enter the dip tube which otherwise would interrupt the flow of material and cause sputtering. A sight glass 58 extending through the housing wall 22 can be used to visually observe the material to control the material level. Likewise, the torque sensor 42 can be used to sense and thus control the level of material in the housing.

Alternatively, the housing can be completely filled with material as when gas is injected through lines 16a or 16b. In this case, the delivery pressure of the material to the mixer can be used to force the material/gas solution out of the mixer and to the dispensing nozzle.

The housing 22 may be heated if desired, for example, in a temperature range of 70° F. to 600° F. by means of a band heater 60. Ports 62 may be provided along the length of the housing for insertion of thermocouples to measure the temperature of material within the housing. A stator 64 in the bottom of the housing 22 having a cross section closely conforming to the radius of the disks at the lower nip of the disks prevents substantial bypassing of the material through the lower nip of the disks. Rather, on rotation of the disk, the polymer tends to adhere to the surface of the disk and thus is picked up from the bottom of the housing and brought to the upper surface. When gas is injected into a head space above the disk, the polymer brought to the surface is exposed to the gas creating fresh contacting surface for entraining the gas in the polymer. Thus, a "finger" of gas is drawn below the static fluid level following the flow of the fluid and with proper disk geometry mixes and dissolves in the polymer. The disk mixer both breaks up large bubbles of gas in the polymer and also entrains very small gas bubbles at the nip 51. Where gas bubbles are added to the polymer either as the polymer is metered into the disk mixer or through the upstream end of the mixer, rotation of the disks causes stretching of the gas bubbles generating surface area for dissolution to occur. Thus, with a high viscosity, high molecular weight polymer, rotation of the disks maintains laminar flow of the polymer material creating surface by separating the fluid along its flow lines. This generates maximum surface area with a minimum amount of work and thus minimum power consumption in the mixing operation.

Although FIGS. 1-4 show the orientation of the disk mixer to be one where the shafts on which the disks are mounted are substantially horizontally disposed, that particular orientation is not critical. It is of course necessary to have the shafts horizontal when a gas head space is created above the polymer material. However, where the foaming gas is mixed with the polymer either before or at the time of its injection into the disk mixer, the mixer can be on a vertical axis with either the upstream or downstream end at the higher elevation or in any orientation therebetween since the polymer material fills the interior in the housing. Moreover, the number of disks used and their diameter, thickness and spacing can be altered depending on the viscosity of the material being handled and desired throughput rates. Thus, it is believed that with relatively low viscosity materials on the order of 500 to 5,000 centipoises a large number of relatively small thin disks in a small volume unit operated at a high shaft rpm would be suitable. With higher viscosity materials on the order of 5,000 to 3,000,000 centipoises, fewer large diameter disks spaced further apart and operated at lower speeds could be used.

Still further, the disk mixer is subject to a number of variations. For example, it is not necessary that both shafts be rotated. Rather, mixing has been successfully carried out by rotating only one of the shafts 24, 26 such that the disks on the rotating shaft intermesh with the fixed, non-rotating disks on the other shaft. This demonstrates that successful mixing can be accomplished by intermeshing disks, one set being on a rotor and the other on a stator. Also, the present invention contemplates a number of shafts (greater than the two shown in the Figures) carrying disks which intermesh with the disks on adjacent shafts. In accordance with the principles stated, some of these shafts may be operated as rotors and some as stators or all as rotors.

In the embodiment of the invention wherein the housing 22 is adapted to be filled completely with polymer, it is contemplated that a second stator be located within the housing 22 having a contour similar to that of stator 64 and opposite thereto. These stators are believed to reduce the presence of eddies and stagnant material areas that otherwise would decrease the efficiency of the mixing unit. Thus although desirable in this regard, they are not absolutely necessary for mixing.

Figure 5:
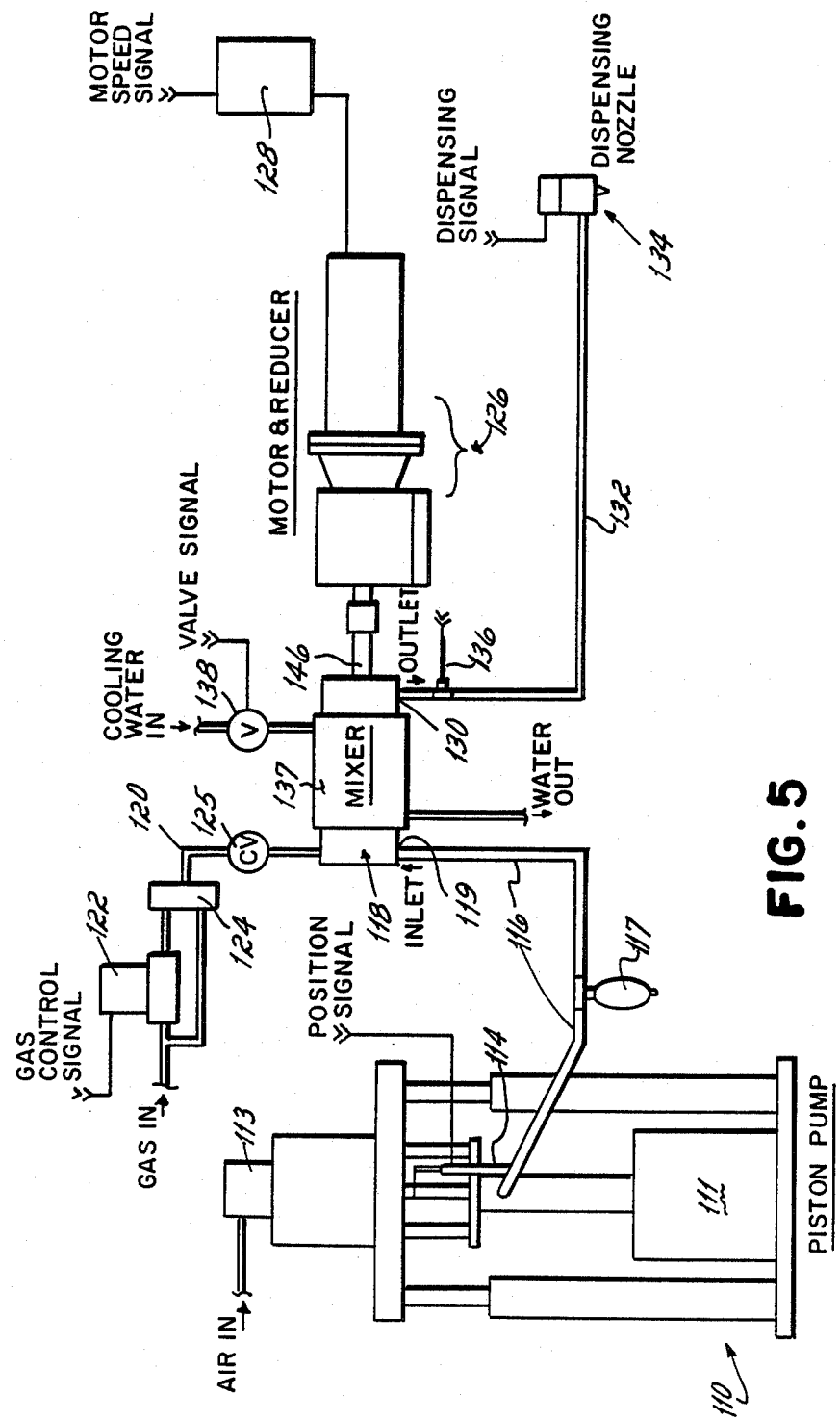
FIG. 5 is a schematic of another system for performing the foaming method of this invention.

Referring now to FIG. 5 of the drawings, a schematic illustration of another system for performing the method of this invention is shown. This apparatus employs a pump 110 capable of delivering the polymeric material from a bulk source such as a bucket or barrel 111 at a metered rate from about 10 to 1,000 pounds per hour at a pressure normally in the range of 500 to 1,200 psig but of up to 5,000 psig without doing an undue amount of work on the polymeric material thus avoiding raising the polymer temperature. A suitable pump is a double acting piston pump driven by an air motor 113, such as a Johnstone pump. However, any pump capable of providing sufficient pressure to pump the material from the bulk container 111 is suitable. The pump 110 is fitted with a device such as a linear potentiometer 114 to generate a signal proportional to polymer flow rate.

The material to be foamed is conveyed through line 116, which may be a hose capable of conveying liquid material under pressure, through an accumulator 117 to the upstream or inlet end 119 of a disk mixer 118 where it is injected into the mixer.

The foaming gas is supplied to the disk mixer 118 from a pressurized gas supply through a gas line 120. A gas metering valve 122 and a differential pressure valve 124 in line 120 permit control of gas pressure and flow rate to the mixer 118 independent of system pressure and proportional to polymer flow rate. A suitable valve 122 is a Model 5850E Flow Controller manufactured by Brooks Instrument Division, Emerson Electric Co., Hatfield, Pa. The gas is supplied to the mixer 118 close to the polymer material inlet 119. A check valve 125 prevents flow of polymer material into line 120. The polymer and gas are introduced to the mixer 118 at an elevated pressure, e.g., 500 to 1,200 psig. The gas flow path 120 introduces gas bubbles into the mixer close to the line 116 supplying the polymeric material to the mixer 118 such that the gas and polymer enter the mixer together and completely fill it for placing the gas into solution in the polymer in the mixer.

Mixer 118 is driven by a motor and reducer 126 controlled by a standard motor controller 128. At the downstream end of the mixer 118 is an outlet 130 through which the polymer/gas solution passes out of the mixer through a line 132 to a dispensing nozzle 134. The temperature of the polymer/gas solution exiting the mixer is monitored by a thermocouple 136.

The temperature of the mixer may be controlled by circulating cooling water through a jacket 137 (FIG. 6) surrounding the mixer 118 as controlled by a valve 138 responsive to a valve input signal from the thermocouple 136. Generally, the materials described above are unaffected by a temperature rise of up to 20° F. and can withstand a 30° to 50° F. temperature rise. Coolant can be used to maintain these parameters.

Referring now to FIGS. 6 and 7, the construction of the disk mixer 118 is shown in detail. The mixer 118 comprises a tubular housing or barrel 140 which is supported on a mount by means of bolts (not shown). Extending along the long axis of the housing 140 is a shaft 146. Downstream and upstream end caps 148 and 150, respectively, are secured to the respective opposite ends of the housing 140 by suitable means such as bolts 152. The end caps 148 and 150 close the housing 140 ends and include suitable thrust bearings 154 and journals 156 for supporting the shaft 146 for rotation. Since the interior of housing 140 is under pressure and since some applications such as the foaming of hot melt adhesives takes place at elevated temperatures, e.g., 350° F. or higher, the seals must be able to withstand these elevated pressures and temperatures without leaking. Alternatively, small grooves can be placed in the shaft 146 to pump material back to chamber or center core 147.

As shown in FIG. 5, the shaft 146 is driven by an electric motor through a reducer 126. A constant rpm controller 128 can be used to control motor speed.

In this specific embodiment, which is for purposes of illustration and not by way of limitation, the shaft 146 is machined to provide a series of spaced disks 158 which are substantially perpendicular to the axis of the shaft 146. As best seen in FIG. 7, the disks 158 have a series of spaced teeth 160 on the outer circumference separated by slots 162. Moreover, the teeth 160 extend substantially almost to the inner wall 164 of the housing 140 creating individual spaced compartments between the teeth 160, the slots 162, and the housing wall 164 while permitting rotation of the shaft and disks within the housing 140. Operation of the drive motor 126 causes rotation of the shaft 146 which in turn causes rotation of the spaced disks 158 and movement of the teeth 160 and slots 162 with respect to the fixed housing inner wall 164.

The polymeric material enters the housing 140 through a port 119 in the upstream end of the housing communicating with the center bore 147 of housing 140. Line 116 is connected to port 119 by a suitable fitting (not shown). The foaming gas delivered to the housing through line 120 enters through an opening (not shown) in the housing wall close to port 119. Line 120 is connected to the opening by a suitable pressurized hose fitting.

A material outlet port 130 extends through the housing wall 140 at the downstream end of the housing. The port 130 is connected with line 132 and permits the polymer material having gas mixed in solution and being under pressure in the housing 140 to exit the mixer 118 and be conveyed to the dispensing nozzle 134.

The housing 140 may be cooled if desired, for example, by circulating cooling water through the space 170 between the jacket 137 and the outer wall of the housing 140. Ports 172, 174 may be provided for cooling water inlet and outlet, respectively. Alternatively, in applications requiring heating of the polymeric material, e.g., in foaming hot melts, the jacket 137 may be removed and band heaters applied for heating the housing 140 to a desired temperature.

In operation of this embodiment of the invention, the gas and the polymeric material are introduced into the mixer 118 under a pressure in the range from about 500 to 1200 psi. The disks 158 are rotated at a speed of 50 to 200 rpm, preferably in the range of 100 to 200 rpm. As the gas comes into contact with the rotating disks, several phenomena occur. First, as the gas bubbles hit the teeth 160, they are broken up into smaller bubbles. Second, as the gas and the polymer enter and pass through the slots 162 between the teeth 160, which form small chambers rotating with respect to the fixed inner wall 164 of the housing 140, the gas and polymer material are sheared. This action continues as the gas and polymer pass along the length of the housing. Third, as the gas/polymer mixture continually enters and exits subsequent downstream disks as it passes through the housing bore 147, it is cut, sheared, and twisted to provide a high interfacial area between the gas and the polymer. At the end of the mixer outlet 130, the gas is thoroughly mixed and in solution with the polymer.

Although the accompanying figures show the orientation of the mixer to be one where the shaft on which the disks are mounted is substantially horizontally disposed, that particular orientation is not critical. The mixer could be on a vertical axis with either the upstream or downstream end at the higher elevation or in any orientation therebetween since the polymer material fills the interior of the housing.

EXAMPLES

Apparatus

The specific disk mixer used in performing Examples I–V recited below was configured as shown in FIGS. 1–4 and was formed of forged steel 4140 tubing 13.19 inches in length and 4.685 inches in diameter. The tubing had an external Watlow electric band tape heater permitting it to be heated in the range of 70° F. to 600° F. Two shafts extended through the housing as shown in FIG. 3 of the drawings. Each shaft carried 11 solid steel disks 2.625 inches in diameter and 0.25 inches in thickness. The disks were spaced on the shafts to form three stages. In the first stage, the disks were 0.5 inches apart; in the second stage, they were 0.75 inches apart; and in the third stage, they were 1 inch apart. The disks were driven by an electric motor manufactured by Hampton Products Company, Inc. having a variable horsepower from 0 to 3. It was typically operated at less than 0.5 horsepower. The rpm's of the shaft could be varied from 0 to 175 rpm but were typically operated in 100 rpm area. The material was delivered to a nozzle for dispensing which varied between 1/16 and 3/16 inch in internal diameter and ¾ and 1½ inch in length depending on the material and pressures involved.

EXAMPLE I

The apparatus shown in FIGS. 2–4 of the drawings having the physical parameters described above was operated for foaming Eastabond A-3. Eastabond A-3 is a low molecular weight branched polyethylene-based hot melt adhesive composition manufactured by Eastman Chemical Company. Its viscosity, as measured by a Brookfield viscometer, was about 2,200 cps at 350° F. The material was supplied to the mixer at a pressure of 700 to 740 psig at an average flow rate into the mixer of 80 pounds per hour. Nitrogen gas at a temperature of 70° F. and a pressure of 800 psig was added to the polymer stream upstream of the mixer (line 16a of FIG. 1) so that both polymer and gas entered the mixer through the polymer inlet 52. The mixer was operated at about 160 rpm shaft rotation. The material passed through the mixer and was dispensed through the dip tube to a dispensing nozzle. The temperature of the gas/polymer solution exiting the mixer was 350° F. The overall flow rate of material from the mixer was on the order of 80 pounds per hour. The resulting product was a continuous, creamy, very homogeneous foam with small bubbles contained therein. The foam ratio by volume (ratio of volume of material occupied after foaming to volume occupied before foaming) was 2.26:1. This example thus illustrates the foaming of a lower viscosity hot melt adhesive at 350° F. to form a homogeneous adhesive foam.

EXAMPLE II

The apparatus essentially like that of FIGS. 2-4 and used in Example I was operated for foaming an intermediate molecular weight branch polyethylene-based adhesive, Eastabond A-32, again manufactured by Eastman Chemical Company. This material, which is a hot melt adhesive, had a viscosity on the order of 35,000 to 40,000 cps as measured by a Brookfield viscometer at 350° F. It was injected into the disk mixer at a temperature of 350° F. and a pressure of 300 to 550 psig. The flow rate into the mixture was between 15 and 40 pounds per hour. Carbon dioxide at 70° F. and 1,400 to 1,450 psig was metered into the polymer stream at a rate of 0.26 to 0.58 pounds per hour upstream of the mixer. This was accomplished by inserting a porous steel tube in the polymer material flow line to the mixer. The porous tube communicated with the source of gas under pressure. The polymer material stripped the gas bubbles off the surface of the porous tube as it flowed by.

The material with foaming gas added then entered the mixer and passed therethrough with a flow rate from the mixer of 14 to 40 pounds per hour. The mixer was operated at 350° F. and the material was dispensed from the top of the mixer to a 1/16 inch nozzle. The mixer was operated full so that there was no gas head in the mixer. The shafts were rotated at about 96 rpm. The resulting foam had a foam ratio by volume of between 3:1 and 7:1. The foam was homogeneous although it contained larger bubbles than in Example I. This example demonstrates the continuous production of polymeric foams from higher viscosity hot melt adhesives at good flow rates and good foam ratios.

EXAMPLE III

An apparatus similar to that illustrated in FIGS. 2-4 and used in the previous examples was also employed in this example. Eastabond A-32 as used in Example II was mixed with Freon 114 as the foaming agent. The Freon was at temperature of 70° F. and 1,400 to 1,500 psig. It was passed through a porous steel tube as in the previous example which was contained within the flow tube to the mixer containing the hot melt adhesive such that bubbles were pulled off the surface of the porous tube by the hot melt flowing thereby. The flow rate of the Freon was 1.3 pounds per hour or about 3.3% by weight of polymer. Again the mixer was operated full at about 95 rpm shaft rotation. A view through the sight glass in the middle of the mixer indicated that essentially all of the gas bubbles diffused into the polymer material since there were no visible bubbles. The polymer/gas solution was again dispensed through the top of the mixer to a 1/16 inch dispensing nozzle. The material flow rate from the mixer was 14 to 40 pounds per hour. The foam ratio of the material was about 5:1 to 8:1 by volume. Again the resulting product was a continuous homogeneous foam.

EXAMPLE IV

An apparatus similar to that illustrated in FIGS. 2-4 and used in the previous examples was also employed in this example to foam a polyisobutylene sealant manufactured by Tremco Company, JS-792. This material had a viscosity on the order of 740,000 cps as measured by a Brookfield viscometer at a temperature of 375° F. The material was introduced into the mixer through the material inlet at the upstream end of the mixer at a rate of 10 to 30 pounds per hour. Three different gases were used for foaming: $CO_2$, $N_2$ and He. That is, a different gas was used in three separate experiments. Each was supplied into the head space above the material in the mixer. The $CO_2$ and He gas were supplied at a pressure of 250 psig and the $N_2$ gas at 500 psig. The flow rates for $CO_2$, $N_2$ and He gas were on the order of 1%, 0.5% and 0.1% by weight of polymer, respectively. The polymer/gas solution was dispensed at a temperature of 415° F. through the bottom of the mixer for $CO_2$ and $N_2$ gas and through the top for He. The foam ratios for $CO_2$, $N_2$ and He gas used were 2.5:1 to 4:1, 2:1 and 1.5:1, respectively. The resulting mixture in each case was an elastic foam which collapsed with time. The half life of the foam (time to be reduced in volume by 50%) was on the order of 15 to 30 minutes.

EXAMPLE V

An apparatus similar to that illustrated in FIGS. 2-4 was also employed in this example to demonstrate the foaming of a relatively highly viscous polymer material. Dow Corning 732 Silastic RTV manufactured by Dow Corning Company was foamed in this example. This material is a thermosetting RTV silicone rubber. This material is highly shear thinning, and thus its viscosity decreases with shear rate. As such, its viscosity cannot be accurately measured using a Brookfield viscometer. However, it is recognized that this matter is a relatively highly viscous material and, as such, is included within the scope of this invention.

The material was supplied to the mixer at a pressure of 250 psig and a flow rate of about 5 pounds per hour at a maximum temperature of 50° F. Nitrogen gas at a temperature of 70° F. and a pressure of 250 psig was introduced into the head space above the polymer in the mixer. The material exited the top of the mixer at a temperature of less than 80° F. It was dispensed through a 1/16 inch nozzle. The flow rate from the mixer was on the order of 5 pounds per hour and the foam produced had a foam ratio of 2.2:1. The resulting product was a tough, resilient foam rubber having gas cells up to 1/16 inch in diameter. This example demonstrates the efficacy of the present apparatus and method of this invention in forming acceptable foams of relatively high viscosity polymer materials at acceptable throughputs with minimal and acceptable temperature rise of the polymer material.

This experimental work demonstrates that polymeric materials can be foamed with relatively low horsepower requirements and minimal and therefore acceptable temperature rise of the material. For example, Eastabond A-3 was foamed at a horsepower requirement of 0.02. Based on this measured energy input and the heat capacity of the material, this translates to a temperature rise of only 1.4° F. at a throughput rate of 60 pounds per hour. A thermoplastic butyl sealant such as Tremco JS-792 required only 0.07 horsepower and would result in a temperature rise at a flow rate of 60 pounds per hour of only 5.1° F. The high viscosity silicone materials such as Dow Corning 732 Silicone RTV was foamed at a horsepower requirement of only 0.12 and would result in a temperature rise of only 8.7° F. at a throughput rate of 60 pounds per hour. It has been calculated by contrast that a paddle driven by a one horsepower motor would raise the temperature of the silicone RTV sealant well in excess of 100° F.

A disk mixer as shown in FIGS. 6 and 7 was built of 41L40 steel. The length of the bore 147 was 8 inches, and the bore 147 had a radius of 1.008 inches. The housing had an external water jacket 137 permitting it to be cooled in the range of 30° to 70° F. Polymer material inlet temperatures were in the range of 65°-70° F. The shaft 146 extended through the barrel 140, as shown in FIG. 6 of the drawings. The shaft diameter (2) was 1.5 inches. The shaft 146 included sixteen steel disks 2.0 inches in diameter and 0.25 inch in disk width (6). The groove width (7) between disks was 0.25 inch and the groove depth (9) was also 0.25 inch. Each disk had 15 teeth and 15 slots. Referring to FIG. 7, the slot depth (3) was 0.125 inch and the slot width (12) was 0.356 inch. The clearance (8) between the teeth 160 and the wall 164 was 0.008 inch. Fifteen percent of the disk circumference was comprised of the land area of the teeth 160.

The shaft was driven by an electric motor operated typically at about 0.25 horsepower. The shaft was typically rotated in the 100 to 200 rpm range. All materials were foamed with $N_2$ gas. The polymer material and gas were introduced into the mixer at a pressure in the range of 500 to 1000 psi. The material was delivered to a nozzle for dispensing which varied between 0.060 and 0.125 inch in internal diameter and 0.5 and 3 inches in length depending on the material and pressures involved.

EXAMPLE VI

Using the apparatus described immediately above, a white silicone RTV sealant sold by StoufferWacker Silicone Co. under the designation 931 was foamed under the following conditions set out in Table I.

TABLE I

| | |
|---|---|
| Flow rate (g/min) | 87.5 |
| Power (hp) | .171 |
| Power (cal/min) | 1,800 |
| Torque (in-lbf) | 108 |
| Pressure Mixer Inlet (psig) | 688 |
| Pressure Mixer Outlet (psig) | 679 |
| Pressure loss (psig) | 9 |
| Pressure at Pump Outlet (psig) | 714 |
| Pressure at Gun Inlet (psig) | 583 |
| Sealant Temp. @ Mixer Inlet (°F.) | 69.6 |
| Sealant Temp. @ Mixer Outlet (°F.) | 68.8 |
| Temperature Rise (°F.) | −0.8* |
| Cooling Water @ Mixer Inlet (°F.) | 60.0 |
| Cooling Water @ Mixer Outlet (°F.) | 60.9 |
| Temperature Rise Coolant (°F.) | 0.9 |

TABLE I-continued

| | |
|---|---|
| Approximate Water Flow (l/min) | 3.7 |
| Approx. Calories to Coolant (cal/min) | 1,870 |

*Due to cooling water.

Table II shows the results of foaming different commercially available polymers with he mixer shown in FIGS. 5-7. In each case the resulting product was a continuous, creamy, very homogeneous foam with small bubbles contained therein.

TABLE II

| | Max. Density Reduction | Output (lbs/hr.) |
|---|---|---|
| Dow Corning 732 RTV Silicone | 50% | >65 |
| Tremco Spectrem 2 RTV Silicone | 57% | " |
| Tremco Proglaze RTV Silicone | 45% | " |
| Stouffer-Wacker Silicone Co. 930 Series RTV Silicone | 60% | " |
| Essex Chemical Co. Polyurethane B390 | 70% | " |

The foams produced by this invention have a wide variety of uses. They may be injected and molded, used for adhesive applications, foamed in situ to seal openings, seams and cracks, or foamed in situ as part of a manufacturing process such as forming gaskets and seals in place.

The advantages of the present invention can be additionally appreciated by recognizing that currently silicone RTV rubbers are foamed only by using expensive specialty ingredients and a platinum catalyst. The high cost of the material makes its uses extremely limited. The present invention on the other hand provides highly efficient and low cost foaming of polymeric materials for a wide variety of applications extending from hot melt adhesives through the high viscosity thermosetting sealants and caulkings.

It will be recognized the apparatus disclosed and desribed above are illustrative of suitable apparatus for carrying out the present invention and that a wide variety of multiple shaft and disk configurations may be adopted depending on the polymer material being foamed and on the throughput rates desired. It will also be recognized that there may be a number of variations of a flat disk which also achieve laminar flow of the polymer as opposed to turbulent mixing, including a spoked-wheeled configuration. However, those variations which nevertheless produce laminar flow are intended to be encompassed by the term "disk" used herein. It will be further recognized that the present invention can foam materials having viscosities from several thousand centipoises to 1,000,000 cps or more. However, below about 10,000 cps, it is usually more efficient to use a gear pump for foaming. Thus, the present invention finds particular applicability in foaming materials above 10,000 cps and typically above 50,000 cps where problems of inadequate mixing, unacceptable temperature rise, and reduced throughput arise and become increasingly acute.

Thus having described the invention, what is claimed is:

1. The method of forming foams of relatively highly viscous polymeric materials comprising the steps of:
   providing a source of liquid polymeric material having a viscosity of 50,000 centipoises or higher,
   providing a pump in a processing line for said polymeric material upstream of a separate low energy mixer, said pump adapted for force feeding said polymeric material from said source through said mixer, said mixer having a housing with an inlet for receiving said polymeric material and an outlet for dispensing said polymeric material, a series of rotatable spaced disks in said mixer housing for mixing said polymeric material with a gas, force feeding said polymeric material by the action of said pump into and through said mixer along said series of disks, introducing said gas under pressure into said mixer for solubilization in said polymeric material, contacting said polymeric material in the presence of said gas with said series of rotating spaced disks, said rotating disks shearing said polymeric material to increase the surface area thereof and providing a laminar flow of said polymeric material through said mixer to increase dissolution of said gas into said polymeric material to form a polymer/gas solution under pressure, maintaining said gas in solution with said polymeric material in said mixer, dispensing the polymer/gas solution downstream of said mixer outlet with a low pressure drop across said mixer inlet to said outlet thereby avoiding premature foaming of said polymeric material in said mixer whereby said gas is released at atmospheric pressure from solution forming a polymer foam.

2. The method of claim 1 wherein said gas is introduced into a head space above said polymer material in said mixer and wherein said polymeric material entrains said gas from said head space.

3. The method of claim 1 wherein said gas is introduced into said polymeric material as gas bubbles.

4. The method of claim 1 wherein said polymer material is a thermoplastic adhesive and wherein said method includes the step of heating solid thermoplastic adhesive to convert it to a fluid state.

5. The method of claim 1 wherein said polymer material is a thermosetting resin having a viscosity in excess of 200,000 centipoises.

6. The method of claim 1 wherein said method includes the step of cooling said polymeric material to maintain said polymer/gas solution.

7. The method as claimed in claim 1 wherein each said disk has a substantially flat element having a substantially flat surface and said shearing action is caused by movement of said element through said polymer in directions parallel to said flat surface.

8. The method as claimed in claim 7 wherein said material flows through said mixer and the direction of flow of said material is substantially perpendicular to the direction of movement of said flat surface through said polymer.

9. Apparatus for mixing gas with a fluid plymeric material to form a polymer/gas solution at a pressure above atmospheric pressure comprising, in combination:

a pair of substantially parallel, oppositely driven shafts each having a series of spaced disks substantially perpendicular to the axis thereof, the disks on one shaft intermeshing with the disks on the other shaft, a housing surrounding said intermeshing disks, said disks serving to divide said housing into a series of compartments along its length, polymeric material inlet means at one end of said housing, polymer/gas solution outlet means at the other end of said housing, means for introducing a gas into said housing under pressure, and means for driving said shafts and in turn said disks of said shafts to cause mixing of said gas with said polymer within said compartments to form said polymer/gas solution upstream of said polymer/gas solution outlet means, said mixing apparatus adapted to be force fed with said polymeric material by a separate pump in line upstream of said inlet means through said housing to said outlet means such that said gas is maintained in solution with said polymeric material in said apparatus housing for dispensing said polymer/gas solution to atmospheric pressure as a foam with a low pressure drop across said inlet to said means outlet to avoid premature foaming of said polymeric material in said housing.

10. The apparatus of claim 9 wherein said shafts are substantially horizontally disposed, said housing has an interior contour corresponding closely to the contour of a lower arcuate portion of said intermeshing disks, and said means for introducing a gas comprises an opening in the wall of said housing above the centerline of said shafts whereby said gas fills a head space above the polymer material contained in said mixer.

11. The apparatus of claim 9 wherein said means for introducing a gas comprises a gas inlet connectable to a source of gas for introducing gas into said polymer material upstream of said polymer inlet means.

12. Apparatus for mixing gas with a fluid polymeric material to form a polymer/gas solution at a pressure above atmospheric pressure comprising, in combination:

at least one rotatable shaft including a first series of spaced disks substantially perpendicular to the axis thereof and rotatable therewith about said axis, a second series of spaced disks fixed with respect to said first series of spaced disks and intermeshing therewith, a housing surrounding said intermeshing disks, said disks serving to divide said housing into a series of compartments along its length, polymeric material inlet means at one end of said housing, polymer/gas solution outlet means at the other end of said housing, means for introducing a gas into said housing, and means for driving said rotatable shaft to cause said first series of disks to rotate with respect to said second series of disks to cause mixing of said gas with said polymer within said housing to form said polymer/gas solution upstream of said polymer/gas solution outlet means, said mixing apparatus adapted to be force fed with said polymeric material by a separate pump in line upstream of said inlet means through said housing to said outlet means such that said gas is maintained in solution with said polymeric material in said apparatus housing for dispensing said polymer/gas solution to atmospheric pressure as a foam with a low pressure drop across said inlet to said outlet means to avoid premature foaming of said polymeric material in said housing.

13. Apparatus for mixing gas with a fluid polymeric material to form a polymer/gas solution at a pressure above atmospheric pressure comprising, in combination:

at least one rotatable shaft including a first series of spaced disks substantially perpendicular to the axis thereof and rotatable therewith about said axis,
a housing surrounding said shaft and disks,
said disks serving to divide said housing into a series of compartments along its length,
polymeric material inlet means at one end of said housing,
polymer/gas solution outlet means at the other end of said housing,
means for introducing a gas into said housing, and
means for driving said rotatable shaft to cause said disks to rotate to cause mixing of said gas with said polymer within said housing to form said polymer/gas solution upstream of said polymer/gas solution outlet means,
said mixing apparatus adapted to be force fed with said polymeric material by a separate pump in line upstream of said inlet means through said housing to said outlet means such that said gas is maintained in solution with said polymeric material in said apparatus housing for dispensing said polymer/gas solution to atmospheric pressure as a foam with a low pressure drop across said inlet to said outlet means to avoid premature foaming of said polymeric material in said housing.

14. Apparatus for mixing gas with a fluid polymeric material to form a polymer/gas solution at a pressure above atmospheric pressure comprising, in combination:

a tubular housing for containing said gas and polymeric material under pressure having an inner wall,
a shaft extending along the length of said housing,
a series of spaced disks on said shaft substantially perpendicularly to the axis thereof,
the disks on the shaft having a plurality of teeth spaced about their circumferences with slots therebetween, the teeth extending out toward said inner wall of said housing while permitting rotation of said shaft within said housing,
said disks and said slots in said disks serving to divide said housing into a series of compartments spaced about said inner wall and along the length of the housing movable in a circumferential direction with respect to the fixed housing inner wall,
polymeric material and gas inlet means at one end of said housing, and
polymer/gas solution outlet means at the other end of said housing,
said shaft being adapted to be rotated in turn rotating said disks on said shaft to cause mixing of said gas with said polymer within said compartments and between said disks to form said polymer/gas solution upstream of said polymer/gas solution outlet means,
said mixing appratus adapted to be force fed with said polymeric material by a separate pump in line upstream of said inlet means through said housing to said outlet means such that said gas is maintained in solution with said polymeric material in said apparatus housing for dispensing said polymer/gas solution to atmospheric pressure as a foam with a low pressure drop across said inlet to said outlet means to avoid premature foaming of said polymeric material in said housing.

15. The apparatus of claim 13 further comprising a pump means for force feeding said mixing apparatus with said liquid polymeric material into said inlet means and through said housing, said pump means adapted for operating without detrimentally raising the temperature of the polymeric material thereby avoiding an adverse reaction or premature foaming thereof.

16. The apparatus of claim 15 wherein said pump means is a piston pump.

17. Apparatus for mixing gas with a fluid polymeric material to form a polymer/gas solution at a pressure above atmospheric pressure comprising:

a pump in a processing line for said polymeric material upstream of a separate low energy mixer, said pump adapted for force feeding said polymeric material through said mixer, said low energy mixer comprising:
(a) a tubular housing for containing said gas and polymeric material under pressure having an inner wall,
(b) a shaft extending along the length of said housing,
(c) a series of spaced disks on said shaft substantially perpendicularly to the axis thereof,
the disks on the shaft having a plurality of teeth spaced about their circumferences with slots therebetween, the teeth extending out toward said inner wall of said housing while permitting rotation of said shaft within said housing,
said disks and said slots in said disks serving to divide said housing into a series of compartments spaced about said inner wall and along the length of the housing movable in a circumferential direction with respect to the fixed housing inner wall,
(d) polymeric material and gas inlet means at one end of said housing,
(e) polymer/gas solution outlet means at the other end of said housing,
said shaft being adapted to be rotated and in turn rotating said disks on said shaft to cause mixing of said gas with said polymer within said compartments and between said disks to form said polymer/gas solution upstream of said polymer/gas solution outlet means,
said low energy mixer adapted to be force fed with said polymeric material through said housing to said outlet means such that said gas is maintained in solution with said polymeric material in said housing for dispensing said polymer/gas solution to atomospheric pressure as a foam with a low pressure drop across said inlet to said outlet means to avoid premature foaming of said polymeric material in said housing.

18. Apparatus for mixing gas with a fluid polymeric material to form a polymer/gas solution at a pressure above atmospheric pressure comprising:

a piston pump in a processing line for said polymeric material upstream of a separate low energy mixer, said pump adapted for force feeding said polymeric material from said source through said mixer without detrimentally raising the temperature of the polymer material thereby avoiding an adverse reaction or premature foaming thereof,
said low energy mixer comprising:
(a) a tubular housing for containing said gas and polymeric material under pressure having an inner wall,
(b) a shaft extending along the length of said housing, (c) a series of spaced disks on said shaft substantially perpendicularly to the axis thereof, the disks on the shaft having a plurality of teeth spaced about their circumferences with slots therebetween, the teeth extending out toward said inner wall of said housing while permitting rotation of said shaft with said housing, said disks and said slots in said disks serving to divide said housing into a series of compartments spaced about said inner wall and along the length of the housing movable in a circumferential direction with respect to the fixed housing inner wall, (d) polymeric material and gas inlet means at one end of said housing, (e) polymer/gas solution outlet means at the other end of said housing, said shaft being adapted to be rotated in turn rotating said disks on said shaft to cause mixing of said gas with said polymer within said compartments and between said disks to form said polymer/gas solution upstream of said polymer/gas solution outlet means, said low energy mixer adapted to be force fed with said polymeric material through said housing to said outlet means such that said gas is maintained in solution with said polymeric material in said housing for dispensing said polymer/gas solution to atmospheric pressure as a foam with a low pressure drop across said inlet to said outlet to avoid premature foaming of said polymeric material in said housing.

said low energy mixer adapted to be force fed with said polymeric material through said housing to said outlet means such that said gas is maintained in solution with said polymeric material in said housing for dispensing said polymer/gas solution to atmospheric pressure as a foam with a low pressure drop across said inlet to said outlet to avoid premature foaming of said polymeric material in said housing.

* * * * *